United States Patent [19]

McNamee et al.

[11] 4,276,640
[45] Jun. 30, 1981

[54] NOISE TOLERANT MULTIPLEX SYSTEM

[75] Inventors: James W. McNamee, Warren; Gerald E. Homstad, Cortland; Alfonso Vazquez-Cuervo, Warren, all of Ohio; Kenneth J. Henry, Southfield, Mich.

[73] Assignee: General Motors Corporation, Detroit, Mich.

[21] Appl. No.: 54,021

[22] Filed: Jul. 2, 1979

[51] Int. Cl.³ .............................................. H04J 3/00
[52] U.S. Cl. ..................................... 370/77; 370/112; 370/91; 340/147 CN; 340/147 CV
[58] Field of Search ................... 370/77, 91, 112, 100, 370/85, 79; 340/147 CN, 147 CV, 163, 167 R; 371/30

[56] References Cited

U.S. PATENT DOCUMENTS

| | | | |
|---|---|---|---|
| 4,027,301 | 5/1977 | Mayer | 340/183 |
| 4,091,361 | 5/1978 | Eichelberger et al. | 340/168 R |
| 4,101,732 | 7/1978 | Suzuki | 340/167 R |
| 4,156,151 | 5/1979 | Borroni | 340/147 CV |

*Primary Examiner*—Douglas W. Olms
*Attorney, Agent, or Firm*—Albert F. Duke

[57] ABSTRACT

A noise tolerant time division multiplex system including a transmitter and receiver, each constructed as a monolithic integrated circuit and interconnected by a serial data wire. Data as well as power is supplied to the transmitter from a plurality of parallel connected input switches. The transmitter includes a parallel in/serial out shift register controlled by timing logic and further includes a tri-state driver for generating a three-level serial output signal indicative of the status of the input switches. The data is generated at a high rate to eliminate any deleterious effects of noise on the system. The receiver chip receives a regulated energizing potential from the transmitter chip over two additional wires, generates a timing signal from the three-level signal and loads the data in binary format into a serial in/parallel out shift register. When the data is properly positioned in the receiver register the data is transferred to latches which energize appropriate relays to control the direction of rotation of various motors controlling the seats, windows and door locks of an automobile.

6 Claims, 10 Drawing Figures

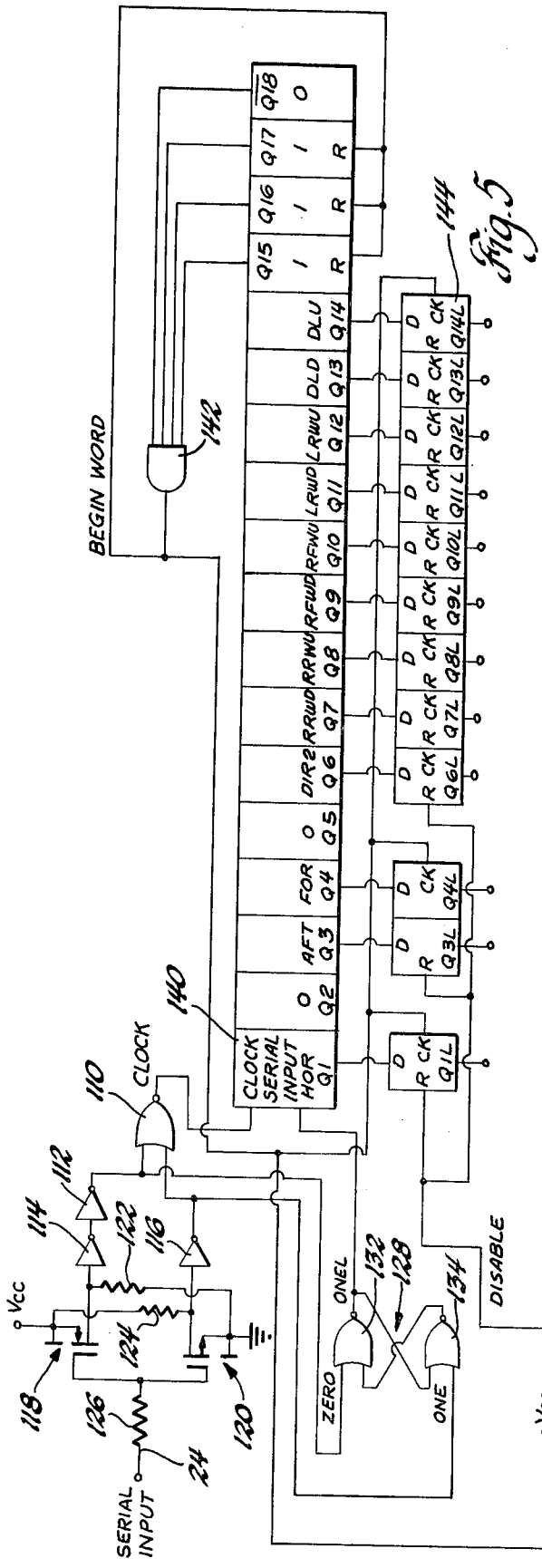
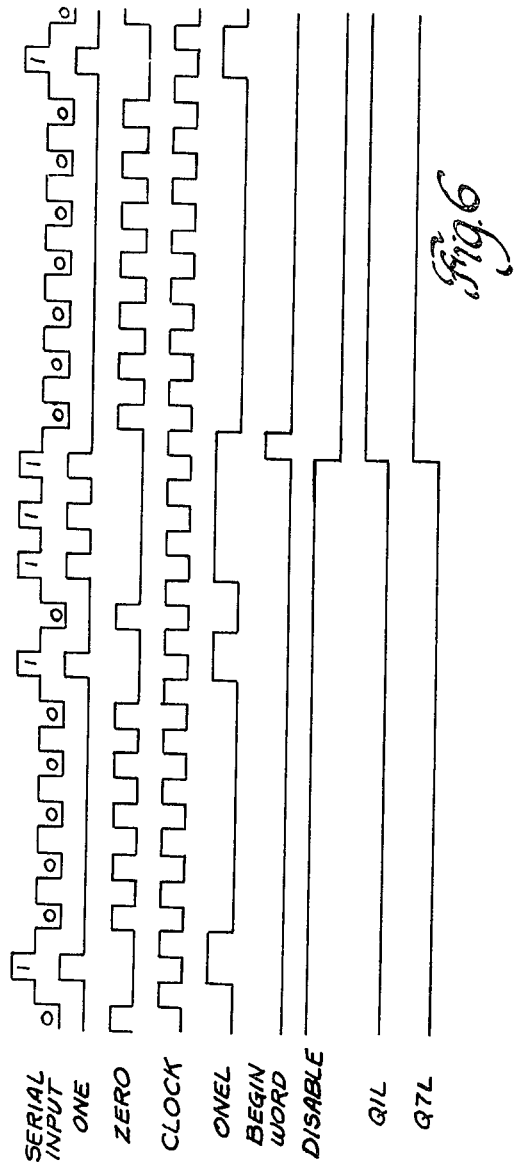
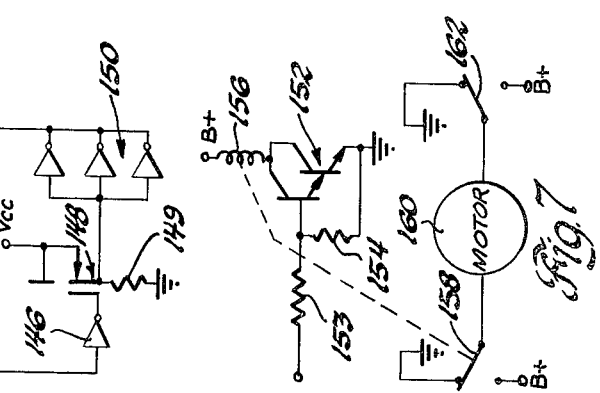

NOISE TOLERANT MULTIPLEX SYSTEM

FIELD OF THE INVENTION

This invention relates to multiplex systems and, more particularly, to a time division multiplex system for an automobile.

BACKGROUND OF THE INVENTION

The control techniques presently employed for operating automobile power door locks, power windows and power seats fall into three categories. The first technique which may be characterized as local control/direct switching, is employed when the input switch and the device it controls are in the same area of the vehicle. For example, the input control switch and actuator motor for the driver's power window are both located inside the driver's door. The second technique, remote control/direct switching, is employed when the input control switch and the device it controls are located in different areas of the vehicle. For example, the input switches located in the driver's door remotely control the window motors in the other three doors. These two techniques require the use of high current input switches and large gauge cables to distribute the power. The third technique, remote control/indirect switching, is generally employed when a more complex control system is required. For example, the power door lock system employs input switches to control a relay which in turn actuates the motors which are located in each of the four doors. This technique permits the use of low current input switches and small gauge control wires which minimizes the large gauge cables required to distribute power.

A multiplex control system is a more refined form of remote control/indirect switching that reduces to a minimum the long length wires required between the input switches and the devices being controlled. In a multiplex control system the input switch information is electronically converted so that it can be sent over a single wire data link to a different area of the vehicle. A receiver then electronically interprets this data and directs it to the proper power switch which in turn instructs the actuator motor to operate. By using a multiplex control system the number of wires, and the conductor crosssectional area, can be substantially reduced. While this reduction in conductors represents considerable improvement, there are other important requirements, such as producibility, reliability, performance and cost which have not been entirely fulfilled in prior art systems which have made them unacceptable for automobile application. One of the problems associated with prior electronic multiplexing systems is their susceptibility to the noisy environment of the automobile. Prior approaches to solving that problem have been attempts to isolate or immunize the system from the environment. Also, prior art systems employ complex digital electronics such as microprocessors at the transmitting and receiving end of the multiplex system. In order to provide a precise time base for serial data communication a crystal reference is usually required with its attendant expense. Furthermore, a precise supply voltage is required which implies external regulator and filter circuitry. Often buffering electronics is required on the inputs and outputs. Such systems thus require printed circuit boards and housings for mounting the various components thereby increasing the space requirements for incorporating such a system in the automobile.

With the foregoing in mind, it is an object of the present invention to provide a multiplex system which requires no special filtering techniques in order to operate reliably in the automotive electrical environment.

It is another object of the present invention to provide a multiplex system utilizing monolithic integrated circuits of relatively simple design, requiring a minimum amount of discrete components and no external filtering thereby eliminating the need for circuit boards and the attendant space requirements.

SUMMARY OF THE INVENTION

One of the characteristics of the automobile electrical environment is that the duration of electrical noise transients in the vehicle is very short, typically 20 microseconds or less. Also, these noise transients occur infrequently, less than 1% of the time that the automobile is operating and at less than 2,000 microsecond intervals. Furthermore, the electric motors utilized to control the door locks, windows and power seats of the automobile have comparatively slow reaction times. The reaction times of these motors are about 1,000 times longer than the worst case noise transient duration.

In accordance with the present invention a multiplex system is provided which is particularly reliable and cost effective for automobile application. The multiplex system of the present invention represents a significant departure from the prior art automotive multiplexing systems in that it is designed to work within the automobile electrical environment rather than attempting to modify it. The system consists of input switches, transmitter electronics, a data link, receiver electronics, controlled switches and actuator motors. When an input switch is closed, the transmitter electronics encodes this information and transmits it serially to the receiver. This information is transmitted over the data link to the receiver at a rate of 10,000 times per second, and the transmission continues as long as the input switch remains closed. The receiver electronics decodes the transmitted information and sends out the appropriate motor control signal to the switches which control the actuator motors. The motor control signals are thus updated continuously at very short intervals, i.e., once every 100 microseconds. Because of the slow reaction time of a typical motor, no motor response becomes evident until the decoded motor control signal has been received 250 times. Thus, while noise transients can interfere with the transmitter electronics, the data link, or the receiver electronics and cause incorrect motor control data to be received, the incorrect motor control data is replaced by correct motor control data, due to the high update rate, before the motor's operation can be affected by the incorrect data. Thus, the high frequency update of the motor control data coupled with the relatively slow reaction time of the motor results in a system which, while not immune to noise, is particularly noise tolerant.

The noise tolerant multiplex control system of the present invention permits the use of relatively simple electronics for the control system and eliminates the need for noise immune memory devices or comlex electromagnetic interference filter circuits. Moreover, no special wire harness constructions, such as shielded cables or twisted pairs or routing methods are required. The simplicity of the electronic circuitry permits existing integrated circuit technology to be employed along with a minimum of discrete components.

Another significant aspect of the present invention is the elimination of system standby power. The controls for seats, windows and door locks require only momentary operation, one to two seconds at most. In accordance with the present invention, the input switches apply both power and logic input to the electronics. This significantly reduces the total operating "on" time of the electronics and since the system is physically isolated from the vehicle's 12 volt electrical system when it is not operating, an extra level of noise immunity is achieved while significantly improving the overall reliability of the system.

In order to avoid a precise time base with the requisite external circuitry, the transmitter of the present invention generates a self clocking tri-state output signal so that both the data and clock information are transmitted over a single conductor to the receiver. Moreover, by generating a tri-state output signal, the electronic circuitry does not require precise voltage regulation. Thus, voltage regulation may be accomplished within the integrated circuit by a simple diode string. While this imprecise voltage regulation may result in transmitter frequency variations, the receiver will be able to track the transmitter due to the self clocking aspect of the tri-state output signal. Also, the transmitter chip ground and regulated supply voltage is applied to the receiver chip over two conductors so that the receiver chip is only powered up when a switch closure powers up the transmitter chip. In other words, the receiver electronics receives its power from the transmitter electronics internal regulated supply line.

A more complete understanding of the present invention may be had from the following detailed description which should be read in conjunction with the drawings, in which:

BRIEF DESCRIPTION OF THE DRAWINGS

FIG. 5 is a detail logic diagram of the receiver of the present invention;

FIG. 6 shows waveforms useful in understanding the operation of the receiver of FIG. 5;

FIG. 7 shows a typical motor control circuit;

DESCRIPTION OF THE PREFERRED EMBODIMENT

Figure 1:
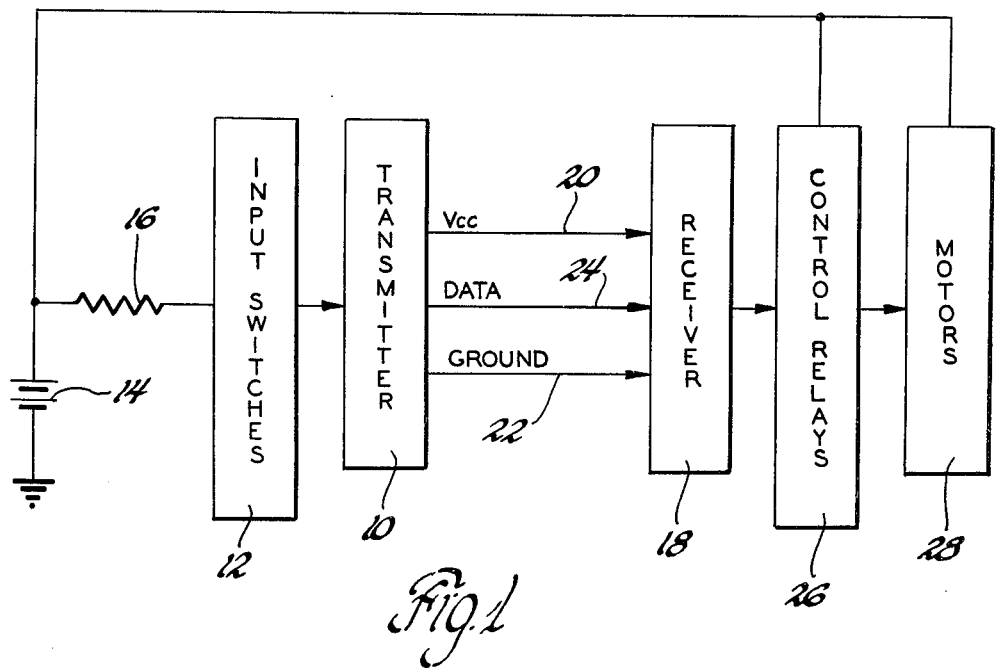
FIG. 1 is a block diagram of the multiplex system of the present invention.

Referring now to the drawings and initially to FIG. 1, the multiplex system of the present invention comprises a transmitter generally designated 10 which receives power from input switches generally designated 12 connected with a source of direct current potential 14 such as the automobile battery, through a 1,000 ohm resistor 16. The transmitter 10 is preferably formed from a single monolithic integrated circuit and includes internal voltage regulation. The regulated voltage provided by the transmitter 10 is supplied to a receiver 18 over conductors 20 and 22 designated Vcc and ground, respectively. The transmitter includes means for establishing a time base, means for generating a serial binary word representative of the state of the input switches 12 and a tri-state generator which supplies data to the receiver 18 over a conductor 24. The receiver 18 derives a clock signal from the data received from the transmitter 10 and converts the serial data into parallel output signals to control relays 26 which receive power from the source 14. The control relays 26 control the direction of rotation of motors 28 connected with the source 14. The motors 28 control mechanisms within the automobile such as the door lock actuators, window actuators, and seat adjuster mechanisms.

Figure 2:
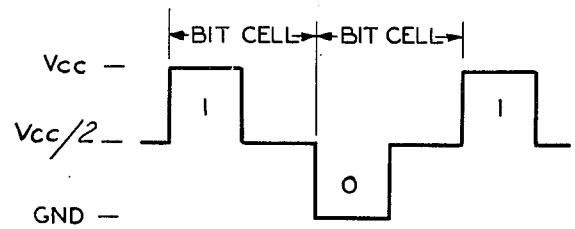
FIG. 2 shows the transmitter output waveform.

The tri-state waveform generated by the receiver 10 is shown n FIG. 2. Each bit cell time the data line 24 switches from one-half the regulated voltage Vcc/2, to either Vcc or ground to respectively generate the binary ones or zeros indicative of the status of the input switches 12. The time allocation for transmitting the 1 or 0 representing the status of each of the switches 12 may be arranged such that the data sequence 0111 cannot occur during operation of the switches 12. This data sequence is utilized as the synchronization code for the system.

Figure 3:
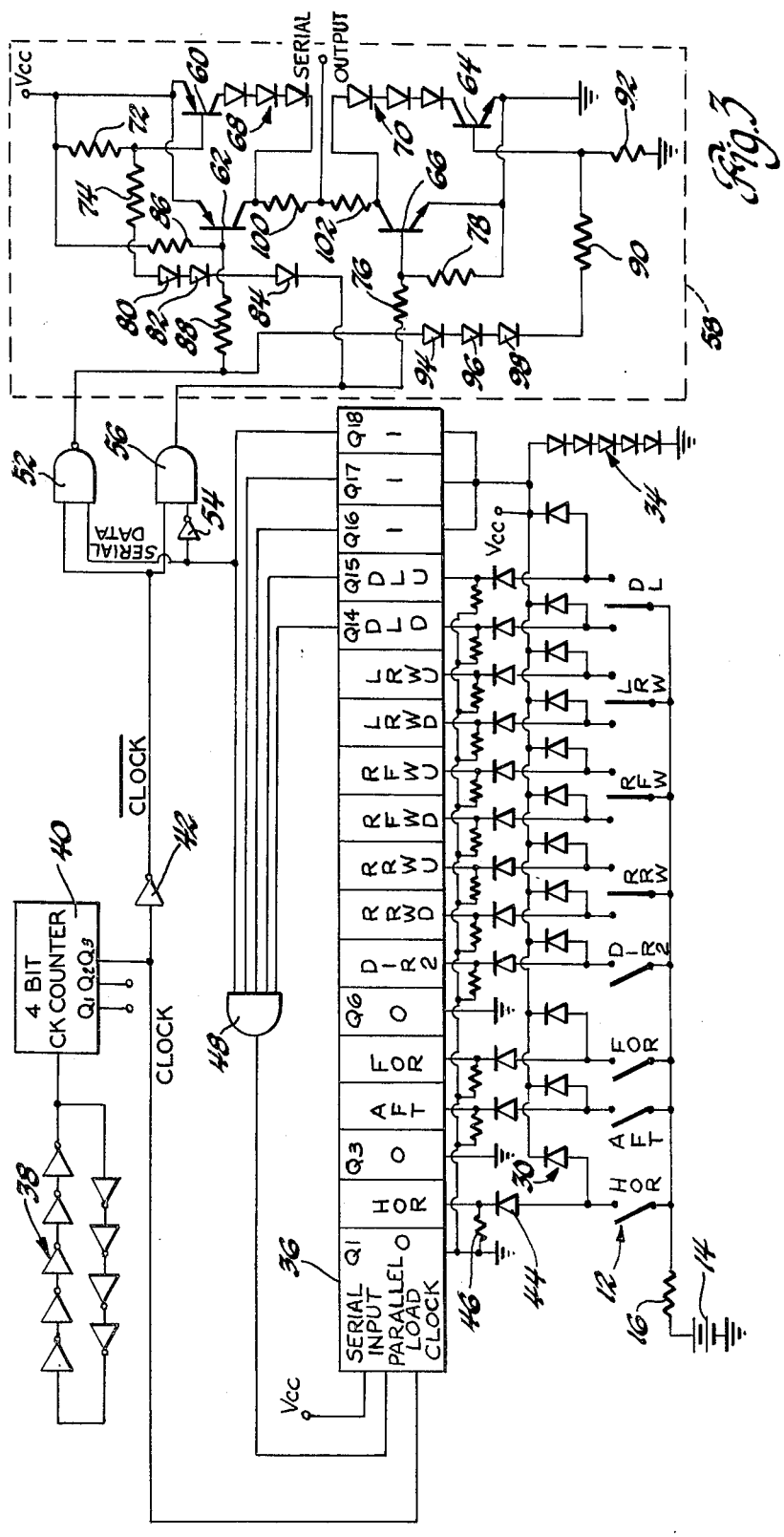
FIG. 3 is a detail logic diagram of the transmitter of the present invention.
Figure 4:
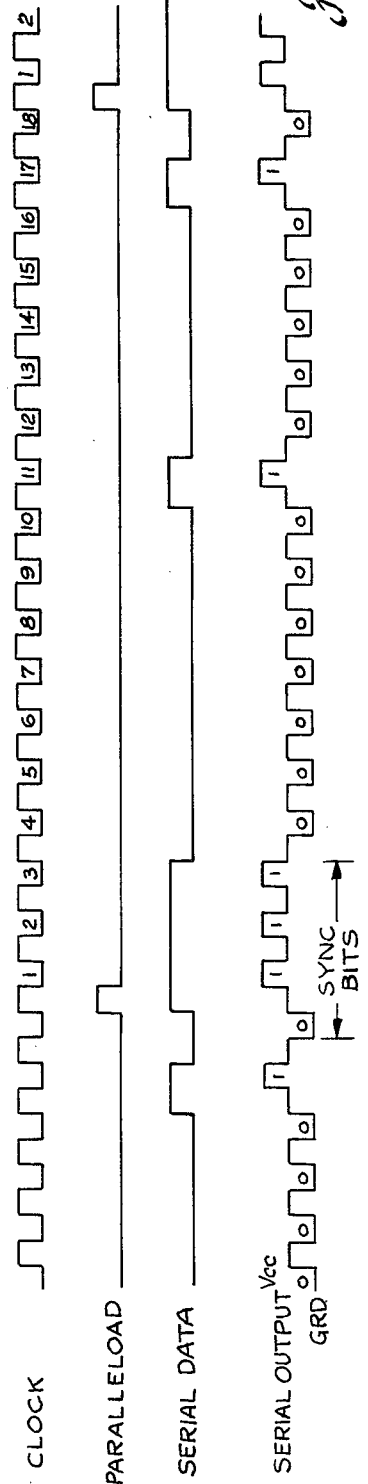
FIG. 4 shows waveforms useful in understanding the operation of the transmitter of FIG. 3.

Referring now to FIGS. 3 and 4, switches 12 selectively apply voltage from the battery 14 to input pins of the transmitter chip 10. Each input pin is connected with a string of diodes 34 through respective steering diodes 30. The diodes 34 establish a regulated voltage at the junction designated Vcc which is applied to the various logic elements of the transmitter chip 10. The transmitter chip 10 further comprises an 18 bit parallel in/serial out shift register generally designated 36. An oscillator generally designated 38 comprises nine inverters and forms a 1.44 MHz time base for the system. The output of the oscillator 38 is applied to a 4 bit counter 40, the Q3 output of which produces a 180 KHz CLOCK signal and through an inverter 42 produces a $\overline{\text{CLOCK}}$ signal.

Each input pin of the transmitter chip 10 is connected with separate stages of the register 36 through respective steering diodes 44 and to ground through respective pull-down resistors 46. Whenever a switch is closed, Vcc or logic 1 is applied to the input of the stage of the register 36 connected therewith while ground or logic 0 is applied to the input of those stages connected with a switch that is open. Also when Vcc is present, i.e., when one of the switches 12 is closed, a logic 1 is applied to the input of the last three stages of the register 36. The first, third and sixth stages of the register 36 are tied to ground so that a logic 0 is applied to the input of these stages. The logic 0 at the first stage in combination with the logic 1 at the last three stages establishes the synchronization code while the logic 0 at the third and sixth stages avoids the potential generation of the synchronization code during seat adjuster commands. The Q14, Q15, Q16, Q17 and Q18 outputs of the register 36 provide inputs to an AND gate 48, the output of which is applied to the parallel load input of the register 36. The serial input terminal of the register is tied to Vcc so that "ones" are clocked into the register as data is shifted out.

Each stage of the register 36 is labeled with the data entered therein as a result of a parallel load of the register 36. The switches designated HOR, AFT, FOR and DIR2 are manually actuable by the operator to adjust the seat. For example, if the seat is to be moved forward or rearward the HOR switch is closed and the DIR2 switch is either closed or remains open depending upon the direction of horizontal movement selected. If the seat is to be raised or lowered, both the FOR and AFT switches are closed and the DIR2 switch is either closed or remains open depending upon the vertical movement selected. To tilt the front or rear of the seat the FOR or the AFT switch respectively is closed and the DIR2 switch is closed or remains open depending on the vertical movement selected. It is possible to command a seat adjustment wherein the HOR, AFT and FOR switches are closed and the DIR2 switch is open. The loading of zeros in the third and sixth stages of register 36 avoids the generation of the synchronization code during this particular seat adjustment. The two position switch DL is manually actuable to lock or unlock the vehicle doors. The two position switches RFW, LRW and RRW are manually actuable to selectively raise or lower the right front, left rear and right rear windows respectively. The left front or driver's window is preferably controlled independently of the multiplexed system.

The Q18 output of the register 36 is designated SERIAL DATA and is applied to one input of a NAND gate 52 and through an inverter 54 to one input of an AND gate 56. The other input to the gates 52 and 56 is $\overline{CLOCK}$. The outputs of the gates 52 and 56 are applied to a tri-state driver generally designated 58 which produces the tri-state waveforms shown in FIG. 2. The driver 58 comprises PNP transistors 60 and 62 and NPN transistors 64 and 66. The emitters of transistors 60 and 62 are tied to Vcc while their collectors are tied together through diodes 68. The emitters of transistors 64 and 66 are tied to ground while their collectors are tied together through diodes 70. A biasing network connected between Vcc and ground comprises resistors 72, 74, 76 and 78 and diodes 80-84. The transistors 60 and 66, as well as the gate 56, are connected with this biasing network. A biasing network connected with the base of transistors 62 and 64 and the output gate 52 comprises resistors 86-92 and diodes 94-98. The output of the driver 58 is from the junction of resistors 100 and 102 connected with the collectors of transistors 62 and 66.

The operation of the transmitter chip 10 in producing the SERIAL DATA output is as follows. If any one or more of the switches 12 is activated, the register 36 will be parallel loaded with data indicative of the status of the switches 12 as well as the synchronization code 0111. This parallel load will occur when Q14–Q18 are all logic 1 and could occur on power up but in any event as a result of clocking "ones" into the register 36 from the serial input thereof. The binary word loaded in the register 36 is then serially shifted out at the Q18 output on successive clock pulses. When a binary word has been shifted out of the shift register 36, the Q14–Q18 outputs thereof will all be high and another parallel load occurs and the shifting of the data continues. It will be noted that the last bit of the previous word was a zero (the bit parallel loaded into Q1), and the first three bits shifted out of the register 36 following a parallel load, are all logic 1. In this manner the four bit synchronization code 0111 is generated. The data to be decoded follows the synchronization code.

The operation of the tri-state generator 58 in producing the output waveform will be explained with reference to the timing diagram shown in FIG. 4 which assumes that the switch HOR is actuated for rearward horizontal seat motion and the switch RRW is actuated to lower the right rear window. Under these conditions a logic 1 is loaded in stages 2 and 8 of register 36. The diagram of FIG. 4 also assumes that at least one previous parallel load of the register 36 has occurred so that the synchronization code 0111 is generated. At the beginning of bit time 10 SERIAL OUTPUT is at Vcc/2. When CLOCK goes low at the beginning of bit time 10, $\overline{CLOCK}$ goes high to enable the gates 52 and 56. Since SERIAL DATA is low, both inputs to the gate 56 are high and its output is high. With the output of gate 56 high, the transistor 66 is on and the transistor 60 is off so that the SERIAL OUTPUT line is low. When CLOCK goes high at the middle of bit time 10 the SERIAL DATA line goes high. With CLOCK high, $\overline{CLOCK}$ is low and the output of gate 52 stays high and the output of gate 56 goes low which turns off the transistor 66 and turns on the transistor 60. However, the transistor 64 draws no current because the SERIAL OUTPUT line is at ground. Transistor 60 saturates and rapidly draws the SERIAL OUTPUT line to the intermediate level of Vcc/2 established by the drop across the three diodes 68. At this point, the diodes 68 are turned off and therefore while both transistors 60 and 64 are on, neither draw current. The transistors 60 and 64 serve to pull the SERIAL OUTPUT line to Vcc/2 very quickly. The SERIAL OUTPUT line stays at the Vcc/2 midpoint until CLOCK goes low at the beginning of bit time 11. At this time the SERIAL DATA line is high and therefore gate 56 remains off. However, $\overline{CLOCK}$ being high drives the output of gate 52 low which turns on transistor 62 and pulls the SERIAL OUTPUT line to Vcc where it remains until CLOCK goes high at the middle of bit time 11. When CLOCK goes high, the SERIAL DATA line goes low. With $\overline{CLOCK}$ low, the gate 56 is disabled and its low output keeps transistor 60 turned on. The output of gate 52 is high which turns off transistor 62 and turns on transistor 64. Since the SERIAL OUTPUT line is at Vcc only transistor 64 draws current which pulls the SERIAL OUTPUT line down until the diodes 70 are turned off which occurs at the Vcc/2 midpoint.

Thus, when CLOCK goes high, data in the register 36 is shifted and the gates 52 and 56 are disabled. The disabling of gates 52 and 56 causes the tri-state driver 58 to bring the SERIAL OUTPUT line to the Vcc/2 midpoint from its existing state. When CLOCK goes low, the gates 52 and 56 are enabled and the data is inverted and presented to the tri-state driver 58 which causes the SERIAL OUTPUT to assume a state of ground if the SERIAL DATA is a zero or a state of Vcc if the SERIAL DATA is a one.

Figure 8:
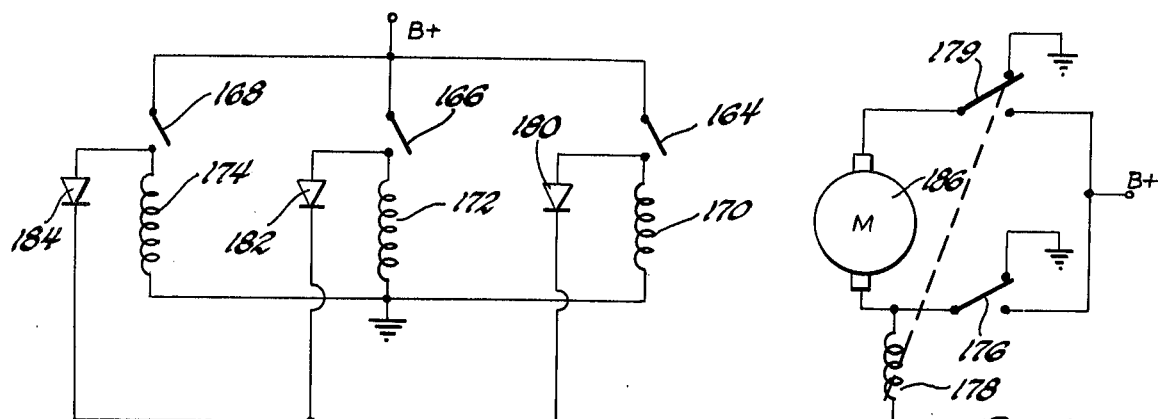
FIG. 8 shows the seat motor control circuit.

Referring now to FIGS. 5 and 6, the receiver chip 18 is shown in more detail. The CLOCK signal for the receiver 18 is derived from logic comprising a NOR gate 110, inverters 112–116, and a complementary pair of MOS transistors 118 and 120. The source of the transistor 118 is connected to Vcc while its drain is connected to ground through a resistor 122. The source of the transistor 120 is connected to ground while the drain is connected to Vcc through a resistor 124. The gate electrodes of the transistors 118 and 120 are connected with the data line 24 through a resistor 126. A latch 128 comprises a pair of cross-coupled NOR gates 132 and 134. The other inputs to the gates 132 and 134 are from the output of the inverters 112 and 116, respectively. When the data line 24 is at the Vcc/2 midpoint level, both of the transistors 118 and 120 are turned off so that both inputs to the gate 110 are low and its output is high. If the line 24 is pulled to ground, i.e., a zero is transmitted, then the transistor 118 is turned on while the transistor 120 remains off. With the transistor 118 turned on, the output of the inverter 112 is high causing the CLOCK signal to go low and the output of the latch 128, designated ONEL, to go low. When the line 24 returns to Vcc/2, CLOCK goes high and shifts the output of the latch 128 into an 18 bit serial in/parallel out shift register 140. When a one is transmitted, the transistor 120 is turned on while the transistor 118 remains off. Consequently, the output of the inverter 116 goes high driving the output of the gate 134 low which combined with the low input to the gate 132 drives this output high. When the data line 24 returns to Vcc/2, the CLOCK signal is again driven high entering the data into the shift register 140. When the synchronization code resides in the last four stages of the register 140 a complete binary word has been received. When this occurs, the output of an AND gate 142 goes high to generate BEGIN WORD which resets the stages 15, 16 and 17 of the register 140, releases the reset on a plurality of latches 144 and enters the data from the register 140 into the latches 144. As long as BEGIN WORD is low, the output of an inverter 146 is high which turns off a transistor 148 connected between Vcc and ground through a resistor 149. With the transistor 148 off, a high is applied to the reset input of each of the latches 144 through inverters 150. When BEGIN WORD goes high, the output of the inverters 150 designated DISABLE goes low to release the reset on the latches 144, and stays low until the gate capacitance of inverter 150 discharges through the resistor 151 to ground. This time constant is approximately one word time, thereby keeping the latches 144 enabled as long as BEGIN WORD occurs regularly. The output of each of the latches 144 is applied to respective amplifiers 152, one of which is shown in FIG. 7 through a current limiting resistor 153 and pull-down resistor 154. When the output of one of the latches 144 is high, the amplifier 154 turns on to energize a relay 156 which controls a single pole-double throw armature 158. The armature 158 normally connects one side of a permanent magnet motor 160 to ground. The other side of the motor 160 is also connected to ground through an armature 162 controlled by a separate relay, which in turn is controlled by one of the other latches 144. For example, if the motor 160 controls the right front window, then the armature 158 and 162 will be controlled by separate relays which respond to outputs Q9L and Q10L. If the window is to be lowered, then Q9L will be high and cause the armature 156 to engage the contact connected with B+. Since the window is to be lowered the Q10L output will, of course, be low. Consequently, the armature 162 will remain connected to ground causing the motor to be operated in a direction to lower the window. If the window is to be raised, then the armature 162 would be pulled into engagement with the contact connected with B+ and the armature 158 would remain connected to ground causing the motor 160 to rotate in the opposite direction to raise the window. Similar relay control circuitry would be provided for the other window control motors and the door lock motors. Referring now to FIG. 8, the seat adjuster solenoid and motor switching circuit is shown. The Q1L, Q3L, Q4L outputs of the latches 144 control respective relays (not shown) having armature 164, 166 and 168 through which the usual horizontal, aft and forward solenoids, 170, 172 and 174 respectively energized. The Q6L output of the latches 144 energizes a relay (not shown) which controls an armature 176 in the ground path of a relay 178. The relay 178 controls an armature 179 and is energizable by either of the switches 164, 166 or 168 through diodes 180, 182 and 184, respectively. If the Q6L output corresponding to the DIR2 bit is low, actuation of any of the armatures 164, 166 or 168 will energize the relay 178 to connect the battery 14 to the motor 186 and cause operation of the motor in one direction. On the other hand, if the DIR2 bit is a logic 1 then the armature 176 is actuated to remove ground from the relay 178 and the motor 186 is energized in the opposite direction.

Figure 9:
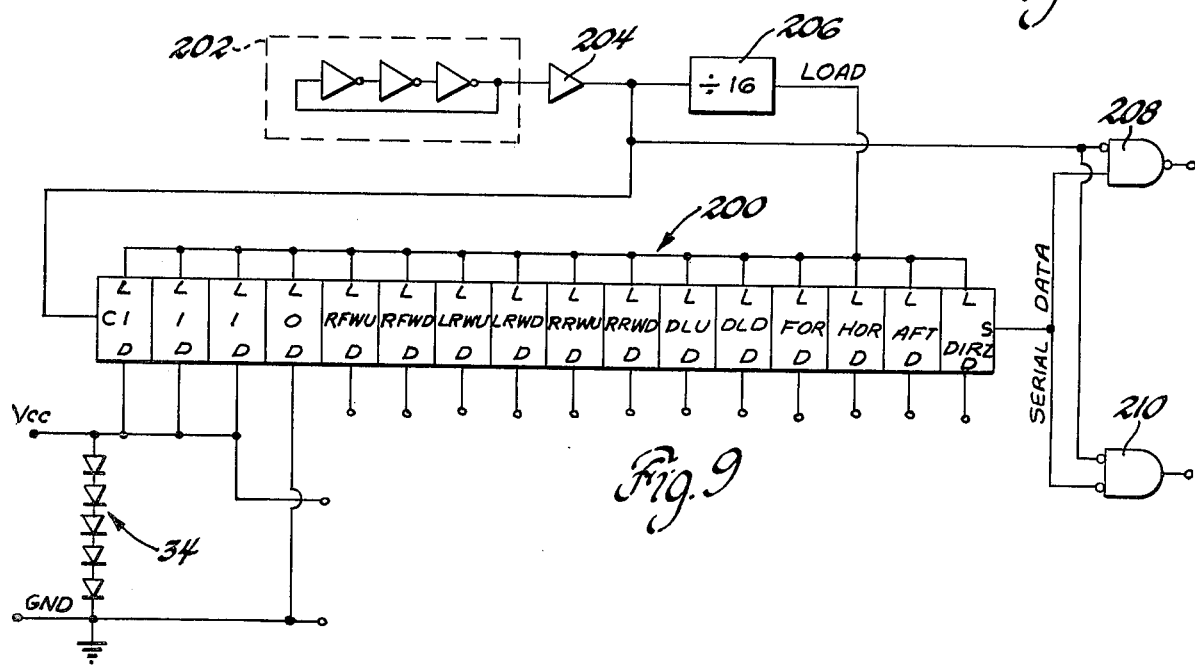
FIGS. 9 and 10 show another embodiment of the invention.

Referring now to FIG. 9, another embodiment of the transmitter of the present invention is shown.

In this embodiment a 16 bit parallel in/serial out shift register 200 is used. The register 200 is clocked from a 160 KHz oscillator 202 through an amplifier 204. A divider 206 produces a 10 KHz LOAD signal for parallel loading the shift register 200. SERIAL DATA is obtained at the output of the last stage of the register 200 and applied to NAND gate 208. SERIAL DATA is inverted and applied to AND gate 210. The CLOCK signal is inverted and applied as the other input to each of the gates 208 and 210. The outputs of the gates 208 and 210 are applied to a tri-state driver (not shown) such as the driver 58 of FIG. 3. In this embodiment the 0111 synchronization code is loaded in the first four stages of the register 200 and the seat adjuster data bits are loaded into the last four stages of the register 200. The remaining data bits are as indicated in the individual stages of the register 200. The inputs to the designated stages are from switches through steering diodes as in FIG. 3.

Figure 10:
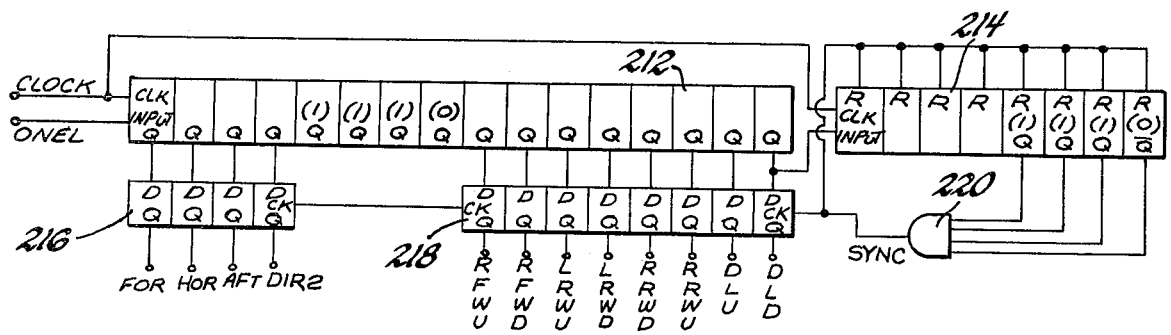

Referring to FIG. 10, the receiver for operating with the transmitter configuration of FIG. 9 includes a 16 bit shift register 212 and an 8 bit shift register 214. Each register 212 and 214 is clocked from a CLOCK signal derived from the trilevel SERIAL INPUT to the receiver by logic such as utilized in FIG. 5. The input to the register 212 is ONEL obtained from the latch 128 of FIG. 5. The input to the register 214 is the output of the register 212 so that the registers 212 and 214 collectively form a 24 bit shift register. The content of the first four and last eight stages of the register 212 are transferred to latches 216 and 218 when the synchronization code is detected. An AND gate 220 detects the presence of the synchronization code in the last four stages of the register 214 and upon detection, resets the register 214 and transfers the data from the register 212 to the latches 216 and 218. The outputs of the latches 216 and 218 are utilized in the manner described in connection with FIG. 5. The FIG. 8 and 9 embodiments achieve proper synchronization no later than reception of the second word transmitted and reduces the size of the transmitter register from 18 to 16 stages. The four seat adjuster command bits entered in the first four stages of the register 214 at the time the synchronization code is detected are cleared to avoid potential synchronization on these bits.

As indicated previously the noise tolerant aspect of the invention is achieved by employing a high update rate. In the instant case of the automobile environment, an update rate of 10,000 times per second has proven sufficient to produce the desired noise tolerance. In general, the minimum data rate may be expressed in equation form as:

$$FD = \frac{4\ TR\ FN}{TR\ (1 - 2\ FNTN) - TO}$$

where
FD = The minimum data word rate
TR = The desired maximum time between actuation of an input switch and operation of an output device
FN = Maximum noise pulse frequency
TN = Maximum noise pulse width
TO = The longest response time of an output device to an energizing signal The following derivation of the aforementioned equation makes the following assumptions.

1. The response time of each of the output devices is greater than the noise pulse width.
2. The cumulative effect of the presence of a turn-on signal at the output device as a function of time is equal and opposite to the cumulative effect of the absence of a turn-on signal at the output device.
3. $TNFN < 0.5$ i.e. the noise duty cycle is less than 50%.
4. No valid data can be received during any time within 1/FD of a noise pulse. This is a worst case assumption.

Under the worst case assumption 4, the time T1, during the noise period, in which good data is received is:

$T1 = (1/FN) - (TN + (2/FD))$

In other words, it is assumed that good data cannot be received during a noise pulse and that the data word preceeding and succeeding the noise pulse may be erroneous. However, assumption 3 requires a doubling of the time of potentially erroneous data because not only is the signal not asserted when a noise pulse occurs but the turn-on signal already in the output device decays at the same rate that it builds up. Therefore, the cumulative effect of the asserted turn-on signal during the noise period is:

$T2 = (1/FN) - 2(TN + (2/FD))$

The number of noise cycles required before the good data contained therein is effective to turn-on the output device is:

$T3 = T0/T2$

In units of time this is:

$T4 = T3/FN$

It is desired that $T4 = TR$ i.e., that the data rate be high enough that the cumulative effect of an asserted turn-on signal is sufficient to activate the output device within the desired response time following an input.
Therefore:

$$TR = \frac{T3}{FN} = \frac{TO}{FNT2} = \frac{TO}{FN\left[\frac{1}{FN} - 2\left(TN + \frac{2}{FD}\right)\right]}$$

Solving for FD:

$$TR = \frac{TO}{1 - 2\ FNTN - \frac{4FN}{FD}}$$

-continued $$\frac{-4FN}{FD} = \frac{TO}{TR} - 1 + 2\ FNTN$$

$$FD = \frac{4FN}{1 - 2\ FNTN - \frac{TO}{TR}}$$

$$= \frac{4TRFN}{TR\ (1 - 2\ FNTN) - TO}$$

If the result of the equation for FD is negative or zero, then the specified TR is not large enough for the given TO, TN and FN.

The embodiments of the invention in which an exclusive property or privilege is claimed are defined as follows:

1. A noise tolerant time division multiplex system for operation in the presence of noise having a maximum frequency FN and maximum pulse width TN, said system including a source of direct current potential for energizing said system, a plurality of input switches, a plurality of output devices, the cumulative effect of the presence of a turn-on signal at an output device as a function of time being equal and opposite to the cumulative effect of the absence of a turn-on signal at the output device, one of said output devices having a response time TO to an energizing signal which is equal to or greater than the response time of the other output devices, transmitter means responsive to actuation of one or more of said switches for developing a multi-bit serial data word indicative of the status of said input switches, receiver means, said transmitter means repetitively transmitting said data word to said receiver means at a minimum word rate of $$\frac{4\ TR\ FN}{TR(1 - 2\ FNTN) - TO}$$

where TR is the desired maximum time interval between actuation of an input switch and operation of an output device, said receiver means responsive to receipt of a data word for producing output signals indicative of the status of said input switches, means responsive to the outputs of said receiver means for selectively energizing said output devices.

2. A noise tolerant time division multiplex system for operation in the presence of noise having a maximum frequency FN and maximum pulse width TN, said system including a source of direct current potential, a plurality of input switches, a plurality of output devices, the cumulative effect of the presence of a turn-on signal at an output device as a function of time being equal and opposite to the cumulative effect of the absence of a turn-on signal at the output device, one of said output devices having a response time TO to an energizing signal which is equal to or greater than the response time of the other output devices, transmitter means connected to said source through said switches whereby said transmitter means is energized only when at least one of said switches is actuated, said transmitter means responsive to actuation of one or more of said switches for developing a multi-bit serial data word indicative of the status of said input switches, said transmitter means repetitively generating said data word as long as at least one of said input switches is actuated and at a minimum word rate of $$\frac{4\ TR\ FN}{TR(1 - 2\ FNTN) - TO}$$

where TR is the desired maximum time interval between actuation of an input switch and operation of an output device, receiver means, first, second and third conductors interconnecting said transmitter and said receiver means, said transmitter means providing an energizing potential to said receiver means over said first conductor whereby said receiver means is energized only when said transmitter means is energized, said transmitter means providing said data word to said receiver means over said second conductor and providing a reference potential to said receiver means over said third conductor, said receiver means including means responsive to receipt of said data word for producing output signals indicative of the status of said input switches, means responsive to the outputs of said receiver means for selectively energizing said output devices.

3. A noise tolerant time division multiplex system for operation in the presence of noise having a maximum frequency FN and a maximum pulse width TN, said system including a source of direct current potential, a plurality of input switches, a plurality of reactive output devices, a first monolithic integrated circuit connected to said source through said switches whereby said first integrated circuit is energized only when at least one of said switches is actuated, said first integrated circuit responsive to actuation of one or more of said switches for developing a multi-bit serial data word indicative of the status of said input switches, said first integrated circuit repetitively generating said data word as long as at least one of said input switches is actuated and a minimum word rate of $$\frac{4\ TR\ FN}{TR(1 - 2\ FNTN) - TO}$$

where TR is the desired maximum time interval between actuation of an input switch and operation of an output device and TO is the maximum response time of an output device to a turn-on signal, said first integrated circuit including means connected with said source for providing an internal regulated supply voltage, a second monolithic integrated circuit, first, second and third conductors interconnecting said first and second integrated circuits, said first integrated circuit providing said regulated voltage to said second integrated circuit over said first conductor whereby said second integrated circuit is energized only when said first integrated circuit is energized, said first integrated circuit providing said data word to said second integrated circuit over said second conductor and providing a reference potential to said second integrated circuit over said third conductor, said second integrated circuit including means responsive to receipt of said data word for producing output signals indicative of the status of said input switches, a plurality of load devices, means responsive to the outputs of said second integrated circuit for selectively activating said load devices.

4. A time division multiplex system including a source of direct current potential, a plurality of input switches, a first monolithic integrated circuit connected to said source through said switches whereby said first integrated circuit is energized only when at least one of said switches is actuated, said first integrated circuit including means connected with said input switches for providing an internal regulated supply voltage, said first integrated circuit including parallel in/serial out shift register means and timing means responsive to actuation of one or more of said switches for developing a multi-bit serial binary word containing synchronization bits and data bits, said data bits indicative of the status of said input switches, said first integrated circuit repetitively generating said binary word as long as at least one of said input switches is actuated, said first integrated circuit including means responsive to said binary word for developing a self-clocking three-level output signal representative of said binary word, a second monolithic integrated circuit, first, second and third conductors interconnecting said first and second integrated circuits, said first integrated circuit providing said regulated voltage to said second integrated circuit over said first conductor whereby said second integrated circuit is energized only when said first integrated circuit is energized, said first integrated circuit providing said output signal to said second integrated circuit over said second conductor and providing a reference potential to said second integrated circuit over said third conductor, said second integrated circuit including means responsive to said three-level output signal of said first integrated circuit for deriving a timing signal and said binary word therefrom, serial in/parallel out shift register means responsive to said timing signal for storing said binary word, latch means, means responsive to storage of said synchronization bits at predetermined locations in said serial in/parallel out shift register means for transferring said data bit to said latch means, a plurality of load devices, control switch means responsive to the outputs of said latch means for selectively activating said load devices in accordance with said data bits.

5. A time division multiplex system including a source of direct current potential, a plurality of manually operated input switches, current limiting means connecting said switches to said source, a first monolithic integrated circuit connected to said switches whereby said first integrated circuit is only energized when at least one of said switches is actuated, said first integrated circuit responsive to actuation of one or more of said switches for developing a multi-bit serial binary word containing synchronization bits and data bits, said data bits indicative of the status of said input switches, said first integrated circuit including a parallel in/serial out shift register and timing means for controlling the loading of said register and shifting of data out of said register, said first integrated circuit further including tri-state driver means for developing a self-clocking three-level output signal representative of said binary word, said first integrated circuit repetitively generating said output signal as long as at least one of said input switches is actuated, said first integrated circuit including means connected with said source for providing an internal regulated supply voltage, a second monolithic integrated circuit, said first integrated circuit providing said regulated voltage to said second integrated circuit over a first conductor; providing said output signal to said second integrated circuit over a second conductor and providing a reference voltage to said second integrated circuit over a third conductor, said second integrated circuit including means responsive to said three-level output signal for producing discrete control signals based on the level of said output signal, said second integrated circuit including means responsive to said discrete control signals for reestablishing said multi-bit serial binary word, a serial in/parallel out shift register, timing means responsive to said discrete control signals for deriving a clock signal, means connecting the clock signal to said serial in/parallel out shift register for serially loading said binary word, a plurality of output latches, means responsive to said synchronization bits occupying predetermined locations in said serial in/parallel out shift register for transferring the data bits in said binary word to respective ones of said latches, a plurality of bidirectional motors, and a plurality of control relay means responsive to the output of respective ones of said output latches for controlling the direction of rotation of said motors.

6. A noise tolerant time division multiplex system for operation in the presence of noise which has a maximum frequency FN and a maximum pulse width TN, said system including a source of direct current potential, a plurality of input switches, a plurality of reactive load devices, one of said load devices having a response time TO to an energizing signal, a first monolithic integrated circuit connected to said source through said switches whereby said first integrated circuit is energized only when at least one of said switches is actuated, said first integrated circuit including means connected with said input switches for providing an internal regulated supply voltage, said first integrated circuit including parallel in/serial out shift register means and timing means responsive to actuation of one or more of said switches for developing a multi-bit serial binary word containing synchronization bits and data bits, said data bits indicative of the status of said input switches, said first integrated circuit repetitively generating said binary word as long as at least one of said input switches is actuated, and at a minimum word rate of $$\frac{4\ TR\ FN}{TR(1 - 2\ FNTN) - TO}$$

where TR is the desired maximum time interval between actuation of an input switch and operation of an output device, said first integrated circuit including means responsive to said binary word for developing a self-clocking three-level output signal representative of said binary word, a second monolithic integrated circuit, first, second and third conductors interconnecting said first and second integrated circuits, said first integrated circuit providing said regulated voltage to said second integrated circuit over said first conductor whereby said second integrated circuit is energized only when said first integrated circuit is energized, said first integrated circuit providing said output signal to said second integrated circuit over said second conductor and providing a reference potential to said second integrated circuit over said third conductor, said second integrated circuit including means responsive to said three-level output signal of said first integrated circuit for deriving a timing signal and said binary word therefrom, serial in/parallel out shift register means responsive to said timing signal for storing said binary word, latch means, means responsive to storage of said synchronization bits at predetermined locations in said serial in/parallel out shift register means for transferring said data bit to said latch means, control switch means responsive to the outputs of said latch means for selectively activating said load devices in accordance with said data bits.

* * * * *